(12) United States Patent
Jarvis et al.

(10) Patent No.: US 6,916,047 B2
(45) Date of Patent: Jul. 12, 2005

(54) SECURE CARD

(75) Inventors: Steve Jarvis, Swanton, VT (US); Ken Whitcomb, Highgate, VT (US)

(73) Assignee: Bertek Systems, Inc., Cincinnati, OH (US)

( * ) Notice: Subject to any disclaimer, the term of this patent is extended or adjusted under 35 U.S.C. 154(b) by 0 days.

(21) Appl. No.: 10/230,583

(22) Filed: Aug. 29, 2002

(65) Prior Publication Data
US 2003/0059592 A1 Mar. 27, 2003

Related U.S. Application Data

(60) Provisional application No. 60/316,586, filed on Aug. 31, 2001.

(51) Int. Cl.[7] .................................................. B32B 5/16
(52) U.S. Cl. ..................... 283/102; 283/72; 283/102; 283/901; 283/903; 428/195; 428/207; 428/208; 428/209; 428/211.1; 428/457; 428/462; 428/464; 428/465; 428/511
(58) Field of Search .............................. 428/195.1, 207, 428/208, 209, 211.1, 457, 462, 464, 465, 511, 195, 212, 204; 283/72, 102, 901, 903, 101

(56) References Cited

U.S. PATENT DOCUMENTS

| | | | |
|---|---|---|---|
| 4,095,824 A | | 6/1978 | Bachman |
| 4,120,445 A | | 10/1978 | Carrier et al. |
| 4,241,942 A | | 12/1980 | Bachman |
| 4,273,362 A | | 6/1981 | Carrier et al. |
| 4,591,190 A | * | 5/1986 | Clark .......................... 283/102 |
| 5,087,507 A | * | 2/1992 | Heinzer .................... 428/195.1 |
| 5,484,169 A | * | 1/1996 | Chang et al. ................. 283/67 |
| 5,532,046 A | | 7/1996 | Rich et al. |
| 5,542,710 A | | 8/1996 | Silverschotz et al. |
| 5,569,512 A | | 10/1996 | Brawner et al. |
| 5,601,887 A | | 2/1997 | Rich et al. |
| 5,681,065 A | | 10/1997 | Rua, Jr. et al. |
| 5,699,326 A | * | 12/1997 | Haas et al. .................. 368/327 |
| 5,725,935 A | * | 3/1998 | Rajan ....................... 428/195.1 |
| 5,766,812 A | * | 6/1998 | Malhotra ...................... 430/97 |
| 5,785,355 A | | 7/1998 | Main |
| 5,908,209 A | * | 6/1999 | Carides et al. ................. 283/81 |
| 6,027,597 A | | 2/2000 | Main |
| 6,098,889 A | * | 8/2000 | Ogawa et al. .............. 235/492 |
| 6,162,485 A | * | 12/2000 | Chang ........................... 427/1 |
| 6,177,176 B1 | * | 1/2001 | Tanabe et al. .............. 428/192 |
| 6,210,777 B1 | * | 4/2001 | Vermeulen et al. ....... 428/195.1 |
| 6,270,122 B1 | * | 8/2001 | Shadle et al. ................. 283/95 |
| 6,346,316 B1 | * | 2/2002 | Saito et al. ................ 428/32.6 |
| 6,482,489 B1 | * | 11/2002 | Otaki et al. ................ 428/40.1 |
| 6,534,158 B2 | * | 3/2003 | Huang et al. ............... 428/201 |
| 6,758,000 B2 | * | 7/2004 | Sandt et al. .................. 40/300 |
| 2002/0088154 A1 | * | 7/2002 | Sandt et al. .................. 40/300 |
| 2003/0059565 A1 | * | 3/2003 | Otaki et al. ................ 428/40.1 |
| 2003/0194532 A1 | * | 10/2003 | Schulz et al. ............... 428/138 |
| 2003/0234294 A1 | * | 12/2003 | Uchihiro et al. ............ 235/492 |

* cited by examiner

*Primary Examiner*—Derris H. Banks
*Assistant Examiner*—Mark Henderson
(74) *Attorney, Agent, or Firm*—Hahn Loeser & Parks LLP; Michael H. Minns

(57) ABSTRACT

A laminated construction that combines card stock with another card stock that has been printed with a dark pigmented coating, such as ink, to prevent the show through of information that appears beneath a scratch-off coating over the concealed information.

13 Claims, 2 Drawing Sheets

SECURE CARD

This application claims the benefit of U.S. provisional patent application Ser. No. 60/316,586, filed Aug. 31, 2001, which is hereby incorporated by reference herein.

BACKGROUND OF THE INVENTION

This invention relates generally to cards containing information concealed under a scratch-off coating and more particularly to cards having security features to prevent the show-through of the concealed information when a bright light is applied to one side of the card.

Scratch-off coatings are commonly used to conceal printed or imaged information, such as a lottery card, phone card, or game piece. If the scratch-off coatings used are not sufficiently opaque, the concealed information runs the risk of being read if a bright light is shown through the card. To prevent this, very opaque scratch-off coatings such as latex have been used or special foil coated paper board products are used.

The foregoing illustrates limitations known to exist in present cards with concealed information. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, a secure card is accomplished by providing a card with a laminated construction that combines a card stock (plastic, paper, synthetic film, etc.) with another card stock and a dark pigment, which may be in either card stock or may be placed between the card stocks. The two card stocks are laminated together, preferably with an adhesive. The laminated secure card can be used for lottery cards, phone cards, game pieces or other prepaid merchant or gift cards.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
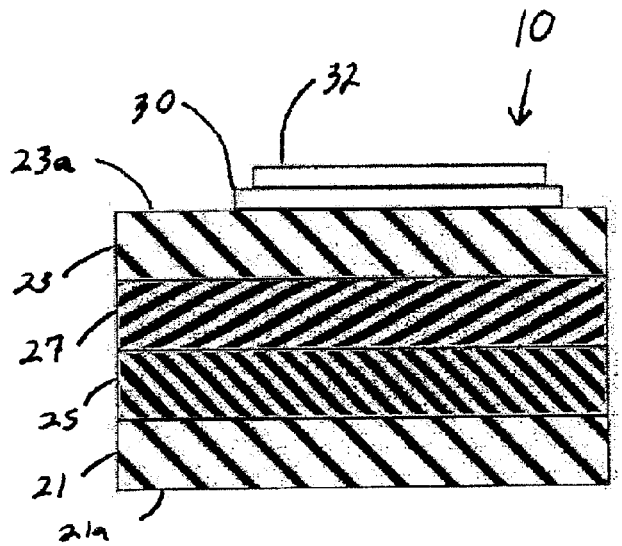
FIG. 1 is a simplified cross-sectional view of a card of the present invention.

Briefly, the secure card 10 is made by taking a first or primary substrate 23, such as a plastic, paper, or synthetic film, and printing fixed information 34 such as a message or design or a combination of both on the outer face 23a of the primary substrate 23 with printing ink, applying variable data 30, such as an account number or PIN to the face 23a of the primary substrate 23 and covering the variable data 30 with a removable coating 32, such as a scratch-off coating to conceal the variable data 30. A second or secondary substrate 21 is printed with a dark pigmented ink (such as black ink) 25 on its inner surface and printed fixed information 34 on its outside surface 21a. The two substrates 21, 23 are laminated or bonded together with a permanent adhesive 27. The finished laminated construct is then die cut into cards 10.

Figure 2:
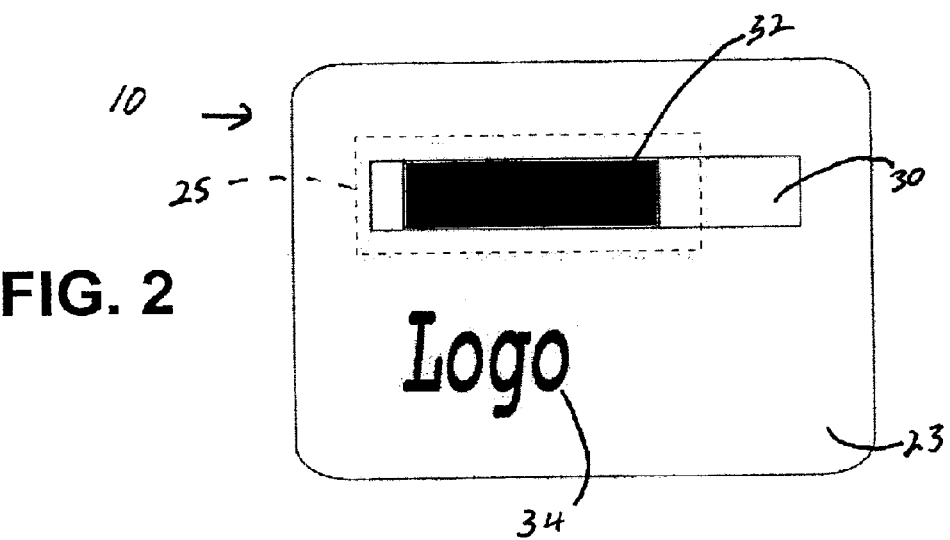
FIG. 2 is a top view of the card shown in FIG. 1.

FIG. 1 shows a preferred embodiment of the secure card 10 comprising two substrates 21, 23 with a dark pigment ink layer 25 printed on the inner surface of one of the substrates 21, 23. A layer of adhesive 27 is placed on one of the two substrates 21, 23 and the two substrates are laminated together. The preferred ink is a UV curable ink and the preferred adhesive is a rubber base hot melt adhesive. FIG. 2 shows an alternate placement of the dark pigment ink layer 25, where the dark pigment ink has a size that corresponds to the size of the concealed variable data 30 and is placed beneath the concealed variable data. Alternatively, the dark pigment ink layer 25 can cover the entire substrate 21 or 23 as shown in FIG. 1.

Figure 1A:
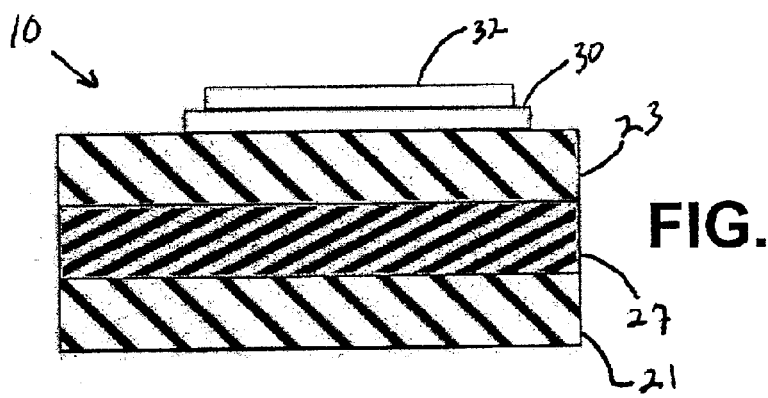
FIG. 1A is a simplified cross-sectional view of a second embodiment of a card of the present invention.

An alternate embodiment of the secure-card 10 is shown FIG. 1A. In this embodiment, the dark pigment is added to either substrate 21 or 23 or to the adhesive 27.

In addition to the preferred dark pigment ink 25, other light blocking pigments can be used, such as any sufficiently opaque pigment of other colors, including white. Light blocking pigments containing metallic components could also be used. Although the preferred light blocking pigment is dark pigment ink 25, an ink of the same color and at least the same density as that used to print the concealed variable data 30 may be used.

Printed matter, comprising fixed information 34 and variable data 30, can be printed on either substrate 21 or 23 or both substrates 21 and 23. Some or all of the variable data 30 can be concealed with scratch-off coating 32. For example, both an account number and a PIN could be printed with only the PIN being covered with scratch-off coating. In addition, magnetic stripes, bar codes, etc. can be placed on the card 10.

Figure 3:
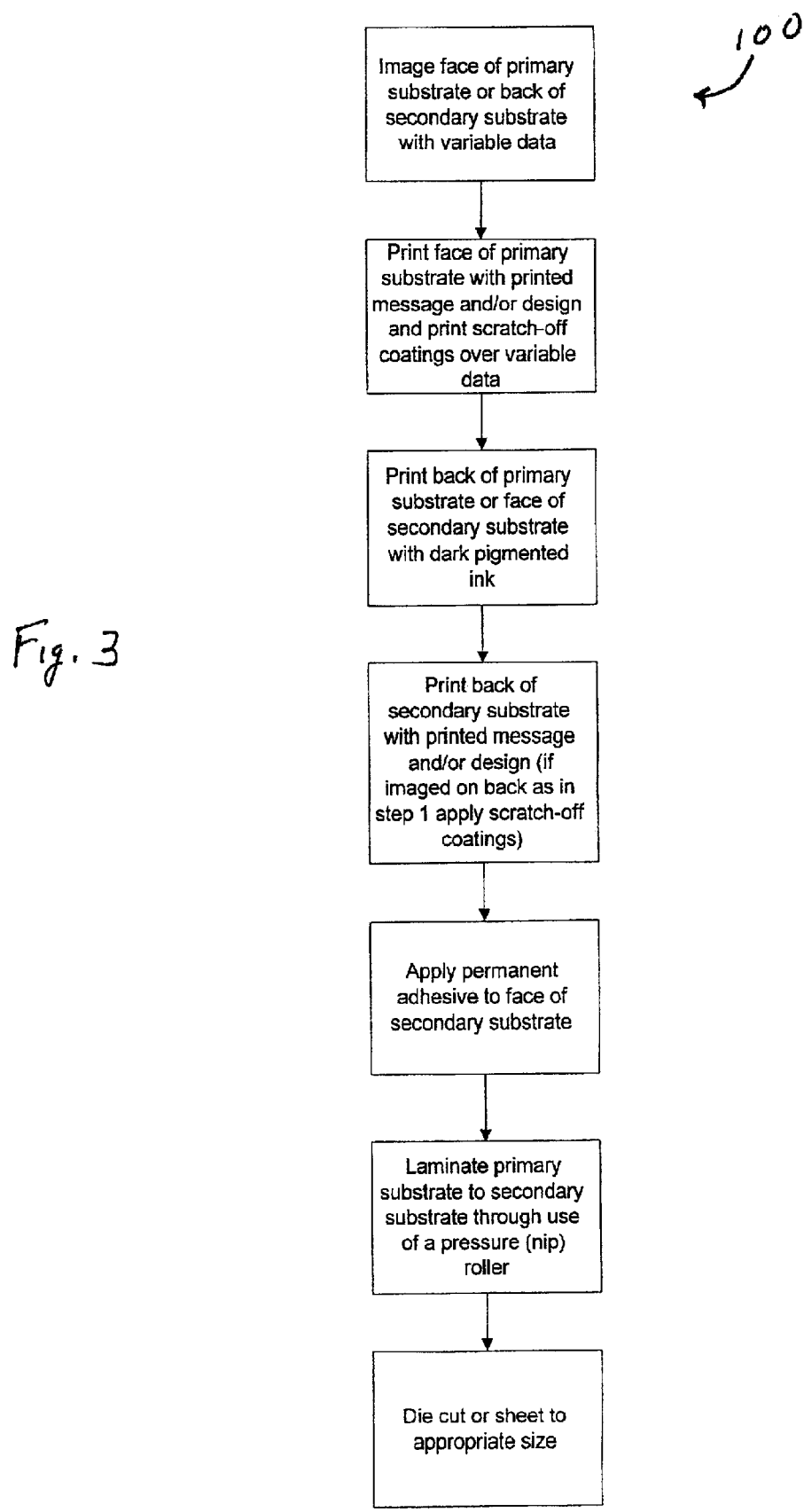
FIG. 3 is a block diagram illustrating a method of making the card shown in FIG. 1.

FIG. 3 illustrates one method 100 of manufacturing a secure card 10 of the present invention. Generally, the order of the steps is not critical to the manufacture of a secure card 10. For example, the variable data 30 may be printed before the fixed information 34, which may include a message, logo, or graphical design. Or the fixed information 34 may be printed before the variable data 30. Although not preferred, the two substrates 21, 23 may be laminated together along with the dark pigment layer 25 before the fixed information 34 and variable data 30, and removable coating 32 are applied.

In FIG. 3, the starting material, substrates 21, 23 are provided in the form of sheets or rolls. The variable data 30 is printed on the outer surface 23a of first substrate 23. Next, the fixed information 34 is printed on the outer surface 23a of the first substrate. The parts of the variable data 30 that need to be concealed, PINs, etc. are then covered with a removable coating 32. For the preferred embodiment, the inner surface of the first substrate 23 or the inner surface of the second substrate 21 is covered with a layer of dark pigmented ink 25. Then fixed information 34 is printed on the outer surface 21a of the second substrate 21. Adhesive 27 is then applied to the inner surface of the second substrate 21 on top of the layer of dark pigmented ink 25. The two substrates 21, 23 are laminated together through the use of a pressure (nip) roller. The printed laminated material is finally die cut to the approximate finished size.

Variable data 30 can be printed on one or both substrates and some or all of the variable data 30 is covered with removable coating 32.

Alternatively, the starting material for secure card 10 can be pre-cut card sized sections of substrate materials. Also, the laminated secure card 10 can be assembled with the two substrates 21, 23, the dark pigment 25 (in one of the substrates, an ink layer on one or both of the substrates 21, 23 or in the adhesive 27) and the adhesive 27, cut to the final size with the printing of the fixed information 34, the variable data 30 and the removable coating 32 being applied after lamination.

Having described the invention, what is claimed is:

1. A card comprising:

a first substrate;

a second substrate laminated to the first substrate with an adhesive;

printed matter on at least a portion of at least the first substrate or the second substrate;

means for blocking examination of at least a portion of the printed matter, the means for blocking examination comprising a light blocking pigment in the adhesive; and a removable coating over at least a portion of the printed matter.

2. The card according to claim 1, wherein the printed matter includes a printed matter pigment of a pre-determined color and density.

3. The card according to claim 1, wherein the light blocking pigment is a dark pigment.

4. The card according to claim 1, wherein the light blocking pigment is an opaque pigment.

5. The card according to claim 1, wherein the light blocking pigment contains metallic components.

6. The card according to claim 2, wherein the light blocking pigment has about the same color as the printed matter pigment pre-determined color.

7. The card according to claim 6, wherein the light blocking pigment has a density at least equal to the printed matter pigment pre-determined density.

8. The card according to claim 6, wherein the light blocking pigment has about the same density as the printed matter pigment pre-determined density.

9. A card comprising:

first substrate;

a second substrate laminated to the first substrate;

a light blocking pigment, the light blocking pigment being at least one of on the first substrate, on the second substrate, in the first substrate, in the second substrate or between the substrates;

printed matter on at least a portion of at least the first substrate or the second substrate; and a removable coating over at least portion of the printed matter, wherein the light blocking pigment has a size and placement that corresponds to the size and placement of the removable coating.

10. The card according to claim 9, wherein the printed matter is positioned between the light blocking pigment and the removable coating.

11. A card comprising:

a first substrate;

a second substrate;

an adhesive securing the first substrate to the second substrate; and a light blocking pigment mixed throughout the adhesive.

12. A card comprising:

a first substrate having an inner surface and an outer surface;

a second substrate having an inner surface and an outer surface;

a layer of light blocking pigment ink applied to at least a portion of at least one of the first substrate inner surface or the second substrate inner surface;

an adhesive between the first substrate inner surface and the second substrate inner surface securing the first substrate to the second substrate;

variable data printed on at least a portion of at least one of the outer surface of the first substrate or the outer surface of the second substrate;

fixed information printed on at least a portion of at least one of the outer surface of the first substrate or the outer surface of the second substrate; and a removable coating over at least a portion of the variable data.

13. The card according to claim 12, wherein the layer of light blocking pigment ink has a size and placement which corresponds to the size and placement of the removable coating.

* * * * *